United States Patent [19]

Coleman et al.

[11] Patent Number: 5,708,064
[45] Date of Patent: Jan. 13, 1998

[54] HIGH REFRACTIVE INDEX PHOTOCHROMIC OPHTHALMIC ARTICLE

[75] Inventors: Charles R. Coleman, Pittsburgh; Robert D. Herold, Monroeville; Christopher D. Selvig, Pittsburgh, all of Pa.

[73] Assignee: PPG Industries, Inc., Pittsburgh, Pa.

[21] Appl. No.: 322,834

[22] Filed: Oct. 13, 1994

Related U.S. Application Data

[63] Continuation-in-part of Ser. No. 138,159, Oct. 15, 1993, abandoned.

[51] Int. Cl.$^6$ .................................................. C08F 4/06
[52] U.S. Cl. ................... 524/90; 252/582; 252/586; 351/159; 351/160 R; 351/162; 351/163; 524/89; 524/700; 524/719; 524/750; 524/751; 524/776; 524/773; 524/547; 524/558; 524/559; 526/286; 526/293; 526/313; 526/314; 526/323
[58] Field of Search ............................ 524/90, 89, 700, 524/750, 776, 773, 547, 558, 559, 751, 719; 526/286, 293, 313, 314, 323; 351/159, 160 R, 162, 163; 252/582, 586

[56] References Cited

U.S. PATENT DOCUMENTS

| | | | |
|---|---|---|---|
| 4,306,780 | 12/1981 | Tarumi et al. | 351/159 |
| 4,851,471 | 7/1989 | Maltman et al. | 524/719 |
| 4,912,185 | 3/1990 | Toh | 526/301 |
| 4,931,220 | 6/1990 | Haynes et al. | 524/90 X |
| 4,994,208 | 2/1991 | McBain et al. | 252/586 |
| 5,130,353 | 7/1992 | Fischer et al. | 524/43 |
| 5,200,483 | 4/1993 | Selvig | 526/301 |
| 5,221,721 | 6/1993 | Selvig | 526/193 |
| 5,236,978 | 8/1993 | Selvig et al. | 524/81 |
| 5,246,989 | 9/1993 | Iwamoto et al. | 524/90 X |
| 5,319,007 | 6/1994 | Bright | 523/516 |
| 5,340,893 | 8/1994 | Takaoka et al. | 526/292.4 |

FOREIGN PATENT DOCUMENTS

| | | |
|---|---|---|
| 1006104A6 | 5/1994 | Belgium. |
| 0 227 337A2 | 7/1987 | European Pat. Off.. |
| 0 305 048 | 3/1988 | European Pat. Off.. |
| 0 453 149 | 10/1991 | European Pat. Off.. |
| 1-156306 | 6/1989 | Japan. |
| 2-247212 | 10/1990 | Japan. |
| 3-269007 | 11/1991 | Japan. |
| 202308 | 1/1992 | Japan. |
| 202309 | 7/1992 | Japan. |
| 117652 | 5/1993 | Japan. |
| 2 270 576 | 5/1994 | United Kingdom. |
| 89/07278 | 8/1989 | WIPO. |
| WO93/04387 | 3/1993 | WIPO. |

OTHER PUBLICATIONS

Derwent Abstracts for JP 04[1992]–202308, JP 04[1992]–202309, JP 05 [1993]–117652 and WO 93/04387.
Translation of title page and claims of JP 05[1993]–117652.

*Primary Examiner*—Judy M. Reddick
*Attorney, Agent, or Firm*—George D. Morris

[57] ABSTRACT

Organic ophthalmic articles are photochromic and have high indices of refraction.

15 Claims, No Drawings

HIGH REFRACTIVE INDEX PHOTOCHROMIC OPHTHALMIC ARTICLE

This is a continuation-in-part of application Ser. No. 08/138,159, filed Oct. 15, 1993 now abandoned.

The present invention is an improvement to photochromic organic ophthalmic articles. As used herein and in the claims, a photochromic compound or article is one which reversibly changes from a light color or colorless state to a darker color when exposed to ultraviolet light (darkening) and then returns to its original light color or colorless state when removed from the influence of ultraviolet light (bleaching) and is capable of undergoing many such cycles of darkening and bleaching.

Photochromic inorganic glass ophthalmic lenses having high indices of refraction are known, but such glass lenses, particularly those providing large optical corrections, are heavy and often uncomfortable to wear. Photochromic organic ophthalmic lenses having low indices of refraction are known, but while they may provide some reduction in weight as compared to glass lenses, they suffer from the requirement that the volume of the lens must be inordinately large.

There is a need for photochromic ophthalmic lenses and other ophthalmic articles such as lens blanks, face plates, and the like, having not only reduced weight as compared with photochromic glass lenses but also reduced volume as compared with the known photochromic organic lenses. The present invention serves the unique function of concurrently providing photochromism, low weight, and low volume to ophthalmic articles.

Accordingly, in a photochromic organic ophthalmic article comprising in combination: (a) a thermoset organic polymeric matrix having a front surface and rear surface; and (b) photochromic compound, one embodiment of the invention is the improvement wherein the article has a refractive index at 20° C. and a wavelength of 589.3 nanometers is at least 1.53.

The high refractive index photochromic organic ophthalmic articles of the present invention are particularly advantageous when the absolute value of optical correction is at least 2 diopters. The advantages become more pronounced as the absolute value of optical correction extends to higher values. Nevertheless, the principles of the present invention are also applicable to plano ophthalmic articles and to ophthalmic articles having small optical corrections. In many cases these articles are lighter because the matrix of the article is of lower density than that of a corresponding article of lower refractive index.

Photochromic compound, mixtures of such compounds, or compositions containing the same (hereinafter "photochromic substances") may be incorporated into a matrix or a portion thereof by various methods described in the art. Such methods include dissolving or dispersing the substance within the matrix, e.g., imbibition of the photochromic substance into the matrix by immersion of the host material in a hot solution of the photochromic substance or by thermal transfer. Alternatively, the photochromic substance may be included as a component of the polymerizable composition which is polymerized to form the matrix polymer. The term "imbibition" or "imbibe" is intended to mean and include permeation of the photochromic substance alone into the matrix, solvent assisted transfer absorption of the photochromic substance into a porous polymer, vapor phase transfer, and other such transfer mechanisms. See U.S. Pat. No. 5,066,818 column 14, line 41 to column 15, line 25 for examples of the above method.

It is preferred that the photochromic compound(s) be imbibed into at least one surface of the photochromic article. Therefore, in a photochromic organic ophthalmic article comprising in combination: (a) a thermoset organic polymeric matrix having a front surface and a rear surface; and (b) photochromic compound imbibed into at least one of the surfaces, another embodiment of the invention is the improvement wherein the article has a refractive index at 20° C. and a wavelength of 589.3 nanometers of at least 1.53.

Most photochromic compounds comprise several rings, one of which opens and closes as the compound is transformed between the light and dark states. The ability of photochromic compounds to open and close involves both physical and chemical interactions with the polymeric matrix. Although high refractive index polymers are known, many, if not most, are unsatisfactory as polymeric matrices for photochromic compounds because such compounds do not function photochromically in association with such polymers. There are two requirements for the polymeric matrix used in the present invention. The first is that it have a high refractive index, that is, an index at 20° C. and a wavelength of 589.3 nanometers of at least 1.53, and second, that photochromic compound(s) dispersed in at least a portion of the matrix be able to function in a photochromic manner.

The matrix comprises polymer formed by polymerizing a polymerizable composition comprising at least one high refractive index imparting monomer. Such monomers are usually aromatic compounds, sulfur containing compounds, or aromatic compounds containing sulfur. The monomers themselves are either well known or can be prepared by procedures well known in the art. Examples of high refractive index imparting monomers include: thiophosphate esters as described in JP 04-249534; styrene; brominated styrene; chlorinated styrene; divinyl benzene; isopropenylbenzene; vinyl naphthalene; isopropenyl naphthalene; bis(vinylthio) benzene as described in JP 02-53809; vinylbenzene thiophosphite ester as described in JP 04-308597; polythiol (meth)acrylate as described in JP 03-11054; vinyl phenyl phosphines as described in U.S. Pat. No. 5,086,140; S-phenylmethyl thio(meth)acrylates as described in JP 01-115910; polyfunctional thio(meth)acrylates as disclosed in JP 01-297242 and EP 0336361; bisphenol bis((meth)acrylates) and ethoxylated bisphenol bis((meth)acrylates) as described in U.S. Pat. No. 4,306,780, GB 2,076,836, JP 02-111742 and JP 02-111743; naphthalenediol bis((meth)acrylates) and ethoxylated naphthalenediol bis((meth)acrylates); aromatic thio(meth)acrylates as described in GB 2,093,843; allyl naphthalene carboxylate; diallyl naphthalene dicarboxylate; allyl benzoate; bisphenol bis(allyl carbonates) and ethoxylated bisphenol bis(allyl carbonates); naphthalenediol bis(allyl carbonates) and ethoxylated naphthalenediol bis(allyl carbonates); thiocarbamates as described in U.S. Pat. Nos. 4,680,369, 4,689,387, 5,013,496, 5,021,503, 5,191,055, 5,191,061, 5,194,599, EP 0530757, and JP 04-117354; vinylbenzene terminated thioethers as described in JP 02-53763, JP 02-268152, JP 03-157061, JP 04-198205, and JP 04-93309; divinylbiphenyl as described in JP 02-113009; diisopropenylbiphenyl; ethoxylated phenol (meth)acrylates; thiodiphenol bis((meth)acrylates); dimercaptophenyl sulfide bis((meth)acrylates); bis((meth)acryloyl) poly(oxyalkylene)thiophenyl sulfides as described in JP 02-247212; thiodiphenyl sulfide bis((meth)acrylates) as described in JP 04-202216; bis(vinylbenzene) thioether urethanes as described in DE 3903279; vinylbenzoyl(poly)thioether (meth)acrylates; vinylbenzyl terminated (poly)thioether; dibenzyl fumarate; dibenzyl maleate; vinyl phenoxathine as described in EP 0320954; ethylphenylvinylbenzodioxole as described in JP 01-156306; ethylphenylvinyl benzodithiole as described in JP 01-156306; N-substituted benzylthiazoline-2-thione as described in JP 03-041110; vinylmercaptobenzoylthiozole as described in JP 02-265907; acryloylmercaptobenzothiozole as described in JP 02-265907; dibenozfuranyl (meth) acrylate as described in JP 03-017107; vinylbenzyl thioether thio(meth)acrylates as described in JP 03-296508; tri (styrylmethyl)thiocyanurate as described in JP 03-145601; (meth)acryloyl(thio)carbamates as described in JP 02-298506; dihydroxybenzene bis((meth)acrylates) and ethoxylated dihydroxybenzene bis((meth)acrylates); dihydroxybenzene bis(allyl carbonates) and ethoxylated dihydroxybenzene bis(allyl carbonates).

One high refractive index imparting monomer or a mixture of two or more such monomers may be used as desired.

The following high refractive index imparting monomers are preferred: bisphenol A bis((meth)acrylate), ethoxylated bisphenol A bis((meth)acrylate) containing from greater than 0 to 10 ethyleneoxy (EO) groups, phenoxyethyl (meth) acrylate, thiodiphenol bis((meth)acrylate), styrene, α-methylstyrene, divinylbenzene, diisopropenylbenzene, diallyl phthalate and bisphenol A bis(allyl carbonate).

The diallyl phthalate may be diallyl o-phthalate, diallyl m-phthalate, diallyl p-phthalate, or a mixture thereof. In most, but not all, instances the diallyl phthalate constitutes from 0 to 40 percent by weight of the total monomer of the composition. Often the diallyl phthalate constitutes from 0 to 25 percent by weight of the total monomer of the composition. From 0 to 10 percent by weight is preferred. When diallyl phthalate is used it usually constitutes from 0.1 to 40 percent by weight of the total monomer of the composition. Often the diallyl phthalate constitutes from 0.5 to 25 percent by weight of the total monomer of the composition. From 1 to 10 percent by weight is preferred.

One or more monomers which do not impart high refractive index to the matrix may optionally be present in the polymerizable composition. There are many such monomers. Examples include the diacrylates and dimethacrylates of ethylene glycol, 1,3-propane diol, propylene glycol, 2,3-butane diol, 1,4-butane diol, 2-ethylbutane-1,4-diol, 1,5-pentane diol, 1,6-hexane diol, 1,7-heptane diol, 1,8-octane diol, 1,10-decane diol, 1,4-cyclohexane diol, 1,4-dimethylolcyclohexane, 2,2-diethylpropane-1,3-diol, diethylene glycol, triethylene glycol, dipropylene glycol, neopentyl glycol; the triacrylates, trimethacrylates, diacrylates and dimethacrylates of glycerol, 1,1,1-trimethylol propane and trimethylol ethane; and the tetraacrylates, tetramethacrylates, triacrylates, trimethacrylates, diacrylates, and dimethacrylates of erythritol. Examples of such monofunctional monomers that may be present may include methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate and octyl methacrylate.

In those instances where high refractive index polymer does not function satisfactorily as the matrix in the present invention because the photochromic compound does not function in a photochromic manner, then by slight reformulation of the polymerizable composition which was polymerized to produce such polymer, a satisfactory polymer may be obtained. This may be accomplished by including one or more flexibilizing compounds in amounts sufficient so that the photochromic compound is able to switch between its dark and bleached states.

One manner of such reformulation is to include one or more mono or multifunctional flexible monomers in the polymerizable composition. Examples of such monomers include poly(alkylene glycol) bis((meth)acrylates), the (meth)acrylate of monoalkyl ether of poly(alkylene glycol); monoaryl ether of poly(alkylene glycol) mono((meth) acrylates); vicinally aliphatic polyurethanes containing terminal bisallyl-, monoallyl/mono(meth)acrylyl, or bis((meth) acrylyl) functional groups such as described in U.S. Pat. Nos. 4,994,208, 5,200,483, 5,221,721 and 5,236,978; poly (diethylene glycol carbonate) bis(allyl carbonate); polythioether poly((meth)acrylate), vinylphenyl terminated polythioether; thiocarbamates: and thioether thiomethacrylates such as described in JP 03-127771; ethoxylated urethane (meth)acrylates such as described in JP 02-151410; S-phenylmethyl thio(meth)acrylates such as described in JP 01-115910; ethylenically unsaturated and poly(ethylenically unsaturated) terminated vicinally aliphatic polyester thiocarbamates, ethylenically unsaturated and poly (ethylenically unsaturated) terminated vicinally aliphatic polyether thiocarbamates; ethylenically unsaturated and poly(ethylenically unsaturated) terminated vicinally aliphatic polycarbonate thiocarbamates; ethylenically unsaturated and poly(ethylenically unsaturated) terminated vicinally aliphatic thiocarbamates having internal combinations of ester, ether and/or carbonate functionality; polyfunctional thio(meth)acrylates such as described in JP 01-297242; bisphenol bis((meth)acrylates) and ethoxylated bisphenol bis((meth)acrylates) as described in U.S. Pat. No. 4,306,780, GB 2,076,836, JP 02-111742, and JP 02-111743; vinylphenyl terminated polyethers such as described in JP 04-93309 and JP-04-198205; bis((meth)acryloyl)poly(oxyalkylene thiophenol sulfides such as described in JP 02-247212; (meth)acrylyl (thio) carbamates such as described in JP 02-298506; poly(butylene glycol) bis((meth)acrylates) such as described in U.S. Pat. No. 5,183,870; poly(alkylene glycol)bis((meth)acrylates); polycaprolactone bis((meth) acrylates); and polycarbonate diol bis((meth)acrylates).

Particularly useful multifunctional flexible monomer includes poly((meth)acrylate) of alkoxylated polyol containing at least 9 alkoxy groups. Preferably such flexible monomer contains at least 12 alkoxy groups. In most cases the alkoxy groups are ethyleneoxy groups, propyleneoxy groups, butyleneoxy groups, or a mixture of two or more thereof. Of these, ethyleneoxy groups are preferred. In those instances where the alkoxylated polyol has a hydroxyl functionality of more than two, it is not necessary that all the hydroxyl groups be converted to (meth)acrylate; however, there should be, on average, at least two (meth)acrylate groups per molecule. Bis((meth)acrylates), tris((meth) acrylates), tetrakis((meth)acrylates), pentakis((meth) acrylates), and hexakis((meth)acrylates) of alkoxylated polyols are contemplated. Examples of suitable polyols which can be alkoxylated include ethylene glycol, 1,3-propane diol, propylene glycol, 2,3-butanediol, 1,4-butanediol, 2-ethylbutane-1,4-diol, 1,5-pentanediol, 1,5-hexanediol, 1,6-hexanediol, 1,7-heptanediol, 1,8-octane diol, 1,10-decanediol, 1,4-cyclohexanediol, 1,4-dimethylolcyclohexane, 2,2-diethylpropane-1,3-diol, diethylene glycol, triethylene glycol, dipropylene glycol, neopentyl glycol, 3-hydroxy-2,2-dimethylpropyl 3-hydroxy-2,2-dimethylpropionate [CAS 1115-20-4], glycerol, 1,1,1-trimethylol propane, trimethylol ethane erythritol, pentaerythritol, dipentaerythritol, sorbitol, and mannitol. Following alkoxylation, two or more of the available hydroxyl groups may be converted to (meth)acrylate groups by methods well known in the art.

Another manner of such reformulation is to include one or more aromatic ring-containing inert plasticizers.

Examples of such aromatic ring-containing inert plasticizers include dioctyl phthalate, alkylene oxide dibenzoate, alkoxylated phenol benzoate, alkoxylated naphthol benzoate, bis(phenylthio)propane-1,3, bis(phenylthio) alkylene ether, the reaction product of phenyl chloroformate and dimercaptan, the reaction product of dimercaptan and phosgene endcapped with phenol, cinnamates, triphenyl phosphite, tri(2-ethylhexyl)trimellitate; triisodecyl trimellitate; poly(alkylene glycol)dinaphthoate, 2-ethylhexyl diphenyl phosphate, isodecyl diphenyl phosphate, and tricresyl phosphate.

Preferably the aromatic ring-containing inert plasticizer is terminated on at least one end with an aromatic ring. It is especially preferred that the aromatic ring-containing inert plasticizer be terminated on at least two ends with aromatic rings.

Often, but not necessarily the aromatic ring-containing inert plasticizer has a refractive index at 20° C. and a wavelength of 589.3 nanometers of at least 1.48. In many instances the refractive index at 20° C. and a wavelength of 589.3 nanometers is at least 1.50. Preferably, the refractive index at 20° C. and a wavelength of 589.3 nanometers is at least 1.51.

The following aromatic ring-containing plasticizers having refractive indices at 20° C. and a wavelength at 589.3 nm of at least 1.48 are preferred: poly(ethylene glycol) dibenzoate, and poly(propylene glycol)dibenzoate, 1,3-bis (phenylthio)propane.

Organo pyrocarbonates are optional materials that may be used to enhance resistance to yellowing of polymerizates. Suitable examples of dialkyl pyrocarbonates that may be used include: dimethyl pyrocarbonate [CAS 4525-33-1], diethyl pyrocarbonate [CAS 1609-47-8], diisopropyl pyrocarbonate, di-n-propyl pyrocarbonate, di-n-butyl pyrocarbonate, di-isobutyl pyrocarbonate, di-secondary butyl pyrocarbonate, di-tertiary-butyl pyrocarbonate [CAS 24424-99-5], diamyl pyrocarbonate, di-tertiary-amyl pyrocarbonate [CAS 68835-89-2], dihexyl pyrocarbonate, diheptyl pyrocarbonate, di-2-ethylhexyl pyrocarbonate, dinonyl pyrocarbonate, didecyl pyrocarbonate and didodecyl pyrocarbonate. Examples of dicycloalkyl pyrocarbonates include dicyclohexyl pyrocarbonate and dicyclooctyl pyrocarbonate. An example of a bis(cycloalkylalkyl)pyrocarbonate is di-4-tertiary butyl cyclohexyl pyrocarbonate. Economically preferred are dimethyl pyrocarbonate and diethyl pyrocarbonate. The amount of organic pyrocarbonate incorporated into the polymerizable composition may vary. When used, only that amount which is sufficient to enhance the resistance to yellowing from externally applied heat to polymerizates prepared from such compositions is required. Such amount may be referred to as a heat-stabilizing amount and will usually be in the range of from about 0.05 to about 0.5 percent by weight of the polymerizable composition. In many instances the amount of organic pyrocarbonate is in the range of from about 0.05 to about 0.4 weight percent. From about 0.1 to about 0.3 weight percent is preferred. The organic pyrocarbonate is incorporated into the polymerizable liquid composition by admixing the selected amount with mild agitation until the pyrocarbonate is dissolved in the polymerizable composition.

Triphenyl phosphite [CAS 101-02-0] is another optional material that may be used to enhance resistance to yellowing. When used, the amount of triphenyl phosphite present in the polymerizable composition of the invention may also vary. Only that amount which is sufficient to further enhance the resistance to yellowing from externally applied heat to polymerizates prepared from such compositions is required. Such amount may be referred to as a further heat-stabilizing amount and will usually be in the range of from about 0.05 to about 0.5 percent by weight of the polymerizable composition. Often the amount of triphenyl phosphite is in the range of from about 0.05 to about 0.4 weight percent. From about 0.1 to about 0.3 weight percent by weight is preferred. The triphenyl phosphite is incorporated into the polymerizable liquid composition of the invention by admixing the selected amount with mild agitation until the triphenyl phosphite is dissolved in the polymerizable composition.

Other optional materials may also be present in the polymerizable composition. Examples of such optional materials include mold release agents, static (non-photochromic) dyes, pigments, polymerization inhibitors to promote stability during storage, and ultraviolet light absorbers (other than the photochromic compounds), antioxidants, and ultraviolet light stabilizers.

The listing of optional ingredients discussed above is by no means exhaustive. These and other ingredients may be employed in their customary; amounts for their customary purposes so long as they do not seriously interfere with good polymer formulating practice. The polymerizable composition may be homogeneous or heterogeneous, but usually it is homogeneous.

Polymerization of the polymerizable composition may be accomplished by adding to the composition an initiating amount of material capable of generating free radicals, such as organic peroxy initiators or organic azo-nitrile initiators, and heating. Methods for polymerizing polymerizable compositions are well known to the skilled artisan and any of those well known techniques may be used to polymerize the aforedescribed polymerizable composition. Suitable examples of organic initiators include: peroxymonocarbonate esters, such as tertiarybutylperoxy isopropyl carbonate; peroxydicarbonate esters, such as di(2-ethylhexyl) peroxydicarbonate, di(secondary butyl)peroxydicarbonate and diisopropyl peroxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobis(isobutyronitrile). Preferred initiators are those that do not discolor the resulting polymerizate, such as diisopropyl peroxydicarbonate.

The amount of initiator used to initiate and polymerize the polymerizable composition may vary and will depend on the particular initiator used, the make-up of the composition, e.g., the amount and type of ethylenically unsaturated group (s) present, and the degree of cure. Only that amount that is required to initiate and sustain the polymerization reaction is required, i.e., an initiating amount. The surface of the cured matrix should not be so hard that, in one embodiment, imbibition of photochromic substances into the matrix by immersion or thermal transfer is inhibited or prevented if that method of incorporating the photochromic substance is used.

Photochromic compound, whether a single photochromic compound or a mixture of photochromic compounds, may be imbibed into a surface of a matrix polymer after the polymer is formed or it may be included as a component of the polymerizable composition prior to polymer formation. If included as a component of the polymerizable composition, then the initiator should be chosen so that it will not destroy the photochromic compound. In such instances, the initiator is usually an organic azo-nitrile initiator or a peroxy initiator.

Photochromic compounds that may be utilized to prepare photochromic articles of the present invention, such as those heretofore described, are organic photochromic compounds or substances containing same that may be incorporated, e.g., dissolved or dispersed, in the organic synthetic host material used to prepare the photochromic articles. Many of such compounds are described in the open literature. For example, spiro(indolino)naphthoxazines have been described, among others, in U.S. Pat. Nos. 3,562,172, 3,578,602, 4,215,010 and 4,342,668. Spiro(indolino) naphthoxazines having certain substituents on the 8' and 9' positions of the naphthoxazine portion of the molecule are the subject of co-pending U.S. patent application Ser. No. 07/993,587, filed Dec. 21, 1992. Spiro(indolino) pyridobenzoxazines are described in U.S. Pat. No. 4,637,698. Spiro(benzindolino)pyrido benzoxazines and spiro (benzindolino)naphthoxazines are described in U.S. Pat. No. 4,931,219. Spiro(benzindolino)naphthopyrans are described in Japanese patent publication 62/195383. Spiro(indolino) benzoxazines are described in U.S. Pat. No. 4,816,584. Spiro(indolino)benzopyrans, spiro(indolino)naphthopyrans and spiro(indolino)quinopyrans are described, for example, in U.S. Pat. No. 4,880,667. Spiro(indolino)pyrans are also described in the text, Techniques of Chemistry, Volume III, "Photochromism", Chapter 3, Glenn H. Brown, Editor, John Wiley and Sons, Inc. New York 1971.

Photochromic organo-metal dithizonates, i.e., (arylazo) thioformic arylhydrazidates, e.g., mercury dithizonates, are described in, for example, U.S. Pat. No. 3,361,706. Fulgides and fulgimides, e.g., the 3-furyl and 3-thienyl fulgides and fulgimides are described in U.S. Pat. No. 4,220,708. 3-pyrrol fulgides and fulgimides are described in U.S. Pat. No. 2,170,202. Spiro(di)hydroindolizines are described, for example, in U.S. Pat. No. 4,931,220 at column 20, line 65 through column 21, line 38.

Certain chromenes, i.e., benzopyrans and naphthopyrans, are described in U.S. Pat. Nos. 3,567,605; 4,826,977 and 5,066,818. Naphthopyran compounds having certain substituents at the number 8 carbon atom and certain substituents at the number 7 or number 9 carbon atom, all substituents being on the naphtho portion of the naphthopyran, are the subject of co-pending U.S. patent application Ser. No. 08/080,246, filed Jun. 21, 1993. Naphthopyrans substituted at the 3 position of the pyran ring with (i) an aryl substituent and (ii) a phenyl substituent having a 5- or 6-member heterocyclic ring fused at the number 3 and 4 carbon atoms of the phenyl substituent are the subject of co-pending U.S. patent application Ser. No. 08/080,250 filed Jun. 21, 1993. Naphthopyran compounds substituted at the number 8 carbon atom on the naphtho portion of the naphthopyran ring with, for example, a methoxy group are the subject of U.S. Pat. No. 5,238,981. Naphthopyran compounds, examples of which are 3-aryl-3-arylalkenyl naphthopyrans are the subject of co-pending U.S. Pat. No. 5,274,132. Certain benzopyran compounds, such as those substituted at the 2 position of the pyran ring with at least one ortho-substituted phenyl and which have a substituted or unsubstituted heterocyclic ring, such as benzothieno or benzofurano ring, fused to the benz portion of the benzopyran are the subject of co-pending U.S. patent application Ser. No. 08/030,932, filed Mar. 12, 1993.

The disclosures of such photochromic compounds in the aforedescribed patents and patent applications are incorporated herein, in toto, by reference. The photochromic articles of the present invention may contain one photochromic compound or a mixture of photochromic compounds, as desired. Mixtures of photochromic compounds may be used to attain certain activated colors.

The amount of photochromic compound or compositioncontaining the same incorporated into the matrix is not critical provided that a sufficient amount is used to produce a photochromic effect discernible to the naked eye. Generally such amount can be described as a photochromic amount. The particular amount used depends often upon the intensity of color desired upon irradiation thereof and upon the method used to incorporate the photochromic compounds. Typically the more photochromic compound incorporated, the greater is the color intensity.

Generally, the amount of each photochromic substance incorporated into the matrix may range from about 0.01 or 0.05 to about 10 to 20 percent by weight. More typically, the amount of photochromic substance(s) incorporated into the matrix will range from about 0.01 to about 2 weight percent, more particularly, from about 0.01 to about 1 weight percent, e.g., from about 0.1 or 0.5 to about 1 weight percent, based on the weight of the matrix. Expressed differently, the total amount of photochromic substance incorporated into an optical matrix may range from about 0.15 to about 0.35 milligrams per square centimeter of surface to which the photochromic substance(s) is incorporated.

The high refractive photochromic organic ophthalmic article of the present invention has a refractive index at 20° C. and a wavelength of 589.3 nanometers of at least 1.53. Often the refractive index under the same conditions is at least 1.54. In many cases, the refractive index under the same conditions is at least 1.55. Even higher refractive indices, such as at least 1.56, at least 1.6, or at least 1.66, are preferred.

In many, but not all cases, the high refractive index photochromic ophthalmic article has a bleach transmission, that is, a luminous transmission of at least 40 percent. Often the bleach transmission is at least 70 percent. Preferably the bleach transmission is at least 80 percent.

The high refractive index photochromic ophthalmic articles usually, but not necessarily also have a heat distortion temperature of at least 35° C. Preferably the heat distortion temperature is at least 40° C. As used in the present specification and claims, heat distortion temperature is determined in accordance with ASTM D 648-86.

As used in the present specification and claims 0-second Barcol hardness and 15-second Barcol hardness are determined in accordance with ASTM-D 2583-81 using a Barcol Impressor and taking scale readings immediately after and 15 seconds after the impressor point has penetrated the specimen.

The invention is further described in conjunction with the following examples which are to be considered to be illustrative rather than limiting, and in which all parts are parts by weight and all percentages are percentages by weight unless otherwise specified.

In each Example, an initiated polymerizable composition was prepared by thoroughly admixing all basic ingredients to form an uninitiated polymerizable composition and then thoroughly admixing initiator with the uninitiated polymerizable composition. The identities of the ingredients and their amounts are shown in Table 2.

EXAMPLES

In the Examples which follow, many of the materials are abbreviated as shown in Table 1.

TABLE 1

| Abbreviation | Material |
|---|---|
| BPA DAC | Bisphenol A bis(allyl carbonate). |
| TBBPA 2EO DAC | Ethoxylated tetrabromobisphenol A bis(allyl carbonate) containing 2 EO units. |
| BPA 2.5EO DMA | Ethoxylated bisphenol A bis(methacrylate) containing 2.5 EO units. |
| BPA 10EO DMA | Ethoxylated bisphenol A bis(methacrylate) containing 10 EO units. |
| PEG 600 DMA | Poly(ethylene glycol) of molecular weight 600 methacrylate-terminated at both ends. |
| MOPEG 1000 MMA | Poly(ethylene glycol) of molecular weight 1000 terminated at one end by a methoxy group and at the other end by a methacrylate group. |
| UR-1 | (Acrylate/allyl carbamate)-terminated polyurethane made as stated in Example 2 of U.S. 5,200,483 except that PHEMA was substituted for diethylene glycol bis(allyl carbonate). |
| UR-2 | (Acrylate/allyl carbamate)-terminated polyurethane made similarly to UR-1 but butanediol was added first then the blend of allyl alcohol and 2-hydroxyethyl acrylate was added. |
| UR-3 | (Acrylate/allyl carbamate)-terminated polyurethane made by the method described in Example 2 of US 5,200,483 except that meta-α, α, α', α'-tetramethylxylene diisocyanate was used in place of isophorone diisocyanate and decaethoxylated bisphenol A was used in place of 530 molecular weight poly(carprolactone)diol. |
| UR-4 | Methacrylate-terminated polyurethane made as described in Example 2 of US 5,200,483 except that 2-hydroxylethyl methacrylate was substituted for both allyl alcohol and 2-hydroxyethyl acrylate. |
| TMP 15EO TA | Ethoxylated trimethylolpropane tris(acrylate) containing 15 EO units. |
| DIPEB | 1,3-Diisopropenyl benzene. |
| DAIP | Diallyl isophthalate. |
| PHEMA | 2-Phenoxyethyl methacrylate |
| TDPDMA | 4,4'-Thiodiphenol dimethacrylate. |
| AMS | α-Methylstyrene. |
| ATA | α-Terpinyl acetate. |
| CH | Cyclohexene |
| DEG DAC | Diethylene glycol bis(allyl carbonate). |
| DEG DAC MIX | A mixture of 60% diethylene glycol bis(allyl carbonate) and 40% poly(diethylene glycol carbonate) bis(allyl carbonate). |

TABLE 1-continued

| Abbreviation | Material |
|---|---|
| PGDB | Propylene glycol dibenzoate. |
| PEG 200 DB | Poly(ethylene glycol) of molecular weight 200 benzoate-terminated at both ends. |
| CLN | 1-Chloronaphthalene. |
| BPTP | 1,3-Bis(phenylthio)propane. |
| TPP | Triphenyl phosphite. |
| DEPC | Diethyl pyrocarbonate. |
| HMBP | 2-Hydroxy-4-methoxybenzophenone. |
| IPP | Diisopropyl peroxy dicarbonate. |
| BIPC | tert-Butylperoxy isopropyl carbonate. |
| TBEC | tert-Butylperoxy 2-ethylhexyl carbonate |
| PC-1 | 3-(2,4-dimethoxy)phenyl-3-(4-methoxy) phenyl-3H-naphtho[2,1-b] pyran. |
| PC-2 | 3(2-fluorophenyl)-3(4-methoxyphenyl)-8-methoxy-9-carbomethoxy-3H-naphtho[2,1-b]pyran. |
| PC-3 | 1,3,3,4,5 (and 1,3,3,5,6)-pentamethyl-9'-methoxycarbonlyl-8'-acetoxy-spiro[indoline-2,3'-[3H]naphth[2,1,b]-[1,4]oxazine]. |
| PC-4 | 1,3-dihydro-3,3,4,5 (and 3,3,5,6)-tetra-methyl-1-propyl-spiro[2H-indole-2,3'-[3H]pyrido{3,2-f} (1,4)benzoxazine]. |
| PC-5 | 1,3-dihydro-3,3-dimethyl-5-methoxy-1-propyl-spiro[2H-indole-2,3'-[3H]pyrido{3,2-t} (1,4)benzoxazine]. |
| PC-6 | 3(2-fluorophenyl)-3(4-methoxyphenyl)-8-methoxy-3H-naphtho[2,1-b]pyran. |
| ED | N-(2-ethoxyphenyl) N'-(2-ethylphenyl) ethanediamide. |
| PD | Bis(1,2,2,6,6-pentamethyl-4-piperdinyl) (3,5-di-tert-butyl-4-hydroxybenzyl) butyl propanedioate [CAS 63843-89-0]. |
| FRD | Sandox Forone Rubine S-2GFL dye C.I. Disperse Red 167:1. |
| FAC | Mixture of 90% fluorinated alkyl alkoxylates [CAS 68958-61-2] and 10% fluorinated alkyl sulfonate [CAS 4151-50-2]. (3M FC-171) |

TABLE 2

Polymerizable Compositions

| | Example | | | | | | | | |
|---|---|---|---|---|---|---|---|---|---|
| | 1 | 2 | 3 | 4 | 5 | 6 | 7 | 8 | 9 |
| Basic Ingredients, Parts | | | | | | | | | |
| BPA DAC | 0 | 0 | 0 | 59.71 | 0 | 0 | 0 | 0 | 0 |
| TBBPA 2EO DAC | 0 | 0 | 0 | 11.50 | 0 | 0 | 0 | 0 | 0 |
| BPA 2.5EO DMA | 42.0 | 42.9 | 50.0 | 0 | 0 | 25 | 70.84 | 77 | 43.5 |
| BPA 10EO DMA | 3.0 | 9.6 | 0 | 0 | 0 | 0 | 0 | 0 | 0 |
| PEG 600 DMA | 20.0 | 0 | 0 | 0 | 0 | 50 | 0 | 0 | 21.0 |
| MOPEG 1000 MMA | 0 | 0 | 0 | 0 | 0 | 0 | 21.16 | 23 | 0 |

TABLE 2-continued

Polymerizable Compositions

| | Example | | | | | | | | |
|---|---|---|---|---|---|---|---|---|---|
| | 1 | 2 | 3 | 4 | 5 | 6 | 7 | 8 | 9 |
| UR-1 | 0 | 0 | 0 | 0 | 18.2 | 0 | 0 | 0 | 0 |
| UR-2 | 0 | 0 | 0 | 9.83 | 0 | 0 | 0 | 0 | 0 |
| UR-3 | 0 | 4.9 | 0 | 0 | 0 | 0 | 0 | 0 | 0 |
| UR-4 | 0 | 0 | 18.9 | 0 | 0 | 0 | 0 | 0 | 0 |
| TMP 15EO TA | 0 | 14.9 | 0 | 0 | 0 | 0 | 0 | 0 | 0 |
| DIPEB | 6.0 | 6.8 | 3.7 | 0 | 0 | 0 | 0 | 0 | 6.0 |
| DAIP | 0 | 0 | 0 | 6.56 | 64.0 | 0 | 0 | 0 | 0 |
| PHEMA | 20.0 | 13.9 | 8.1 | 0 | 0 | 0 | 0 | 0 | 20.5 |
| TDPDMA | 0 | 0 | 0 | 0 | 0 | 25 | 0 | 0 | 0 |
| AMS | 0 | 0 | 9.0 | 0 | 0 | 0 | 0 | 0 | 0 |
| ATA | 0 | 0 | 0 | 1.50 | 0 | 0 | 0 | 0 | 0 |
| CH | 0 | 0 | 0 | 0.60 | 0 | 0 | 0 | 0 | 0 |
| DEG DAC | 0 | 0 | 0 | 0 | 7.8 | 0 | 0 | 0 | 0 |
| DEG DAC MIX | 0 | 0 | 0 | 0 | 10.0 | 0 | 0 | 0 | 0 |
| PGDB | 0 | 0 | 0 | 0 | 10.00 | 0 | 0 | 0 | 0 |
| PEG 200 DB | 8.7 | 6.7 | 0 | 0 | 0 | 0 | 0 | 0 | 8.7 |
| CLN | 0 | 0 | 10.0 | 0 | 0 | 0 | 0 | 0 | 0 |
| BPTP | 0 | 0 | 0 | 0 | 0 | 0 | 8.00 | 0 | 0 |
| TPP | 0.3 | 0.3 | 0.1 | 0.10 | 0 | 0 | 0 | 0 | 0.3 |
| DEPC | 0 | 0.1 | 0.2 | 0.20 | 0.3 | 0 | 0 | 0 | 0.15 |
| HMBP | 0 | 0 | 0 | 0.0075 | 0 | 0 | 0 | 0 | 0 |
| Initiator, Parts | | | | | | | | | |
| IPP | 1.5 | 0.75 | 0.3 | 3 | 2.25 | 0 | 0 | 0.04 | 1.5 |
| BIPC | 0.5 | 0 | 0.1 | 0 | 0 | 0.5 | 0.4 | 0 | 0 |
| TBEC | 0 | 0.25 | 0 | 0 | 0 | 0 | 0 | 0 | 0.5 |

A portion of each initiated polymerizable composition was poured into one or more flat sheet molds having the dimensions shown in Table 3.

TABLE 3

Mold dimensions

| | Example | | | | | | | | |
|---|---|---|---|---|---|---|---|---|---|
| Mold dimensions, mm | 1 | 2 | 3 | 4 | 5 | 6 | 7 | 8 | 9 |
| 152.4 × 304.8 × 3.17 | X | X | X | X | | | X | X | X |
| 152.4 × 152.4 × 6.35 | | | | X | X | | | | |
| 152.4 × 152.4 × 3.17 | | | | | X | | | | |
| 152.4 × 175 × 3.17 | | | | | | X | | | |

A portion of the initiated polymerizable composition of Example 5 was poured into a 6-base plano lens mold.

The molds were placed in an air oven and the initiated polymerizable compositions were cured using one of the cure cycles shown in Table 4.

TABLE 4

Cure Cycles

| Cumulative Hours | Oven Temperature °C. |
|---|---|
| Cure Cycle A | |
| 0 | 34 |
| 24 | 36 |
| 32 | 44 |
| 34 | 46 |
| 36 | 48 |
| 38 | 50 |
| 40 | 54 |
| 42 | 58 |
| 44 | 64 |
| 46 | 69 |
| 48 | 85 |
| 49 | 105 |
| 49.5 | 130 |
| 50.5 | 130 (End of cycle) |
| Cure Cycle B | |
| 0 | 35 |
| ~16 | 35 |
| 24 | 44 |
| 26 | 46 |
| 28 | 48 |
| 30 | 50 |
| 32 | 54 |
| 34 | 58 |
| 36 | 64 |
| 38 | 69 |
| 40 | 85 |
| 41 | 105 |
| 42 | 125 (End of cycle) |
| Cure Cycle C | |
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 |
| 17.5 | 130 |
| 18 | 130 (End of cycle) |

TABLE 4-continued

Cure Cycles

| Cumulative Hours | Oven Temperature °C. |
|---|---|
| Cure Cycle D | |
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 (End of cycle) |

TABLE 4-continued

Cure Cycles

| Cumulative Hours | Oven Temperature °C. |
|---|---|
| Cure Cycle D | |
| 0 | 90 |
| 5.5 | 92 |
| 10 | 96 |
| 11.5 | 99 |
| 13.5 | 101 |
| 15 | 107 |
| 16.5 | 112 |
| 17 | 120 |
| 17.5 | 125 |
| 21.5 | 125 (End of cycle) |

The cure cycle used in each Example is shown in Table 5.

TABLE 5

| | Example | | | | | | | | |
|---|---|---|---|---|---|---|---|---|---|
| | 1 | 2 | 3 | 4 | 5 | 6 | 7 | 8 | 9 |
| Cure cycle | A | B | C | D | D | E | E | D | A |

The polymerizates were allowed to cool in the oven to about 80° C. and then they were removed and demolded. The 3.17 mm thick polymerizates of Examples 1, 2, 3, and 9 were cut into ten 50.8 mm×50.8 mm squares and 12.7 mm×120.6 mm bars. The 3.17 mm thick polymerizates of Examples 4 and 5 were cut into 12.7 mm and 120.6 mm bars. The 3.17 mm thick polymerizates of Examples 6, 7 and 8 were cut into 40 mm×40 mm squares and 12.7 mm×120.6 mm bars. The 2 mm thick polymerizate of Example 1 was cut into twenty-five 25.4 mm× 25.4 mm squares. The 6.35 mm thick polymerizates of Examples 4 and 5 were cut into ten 50.8×50.8 squares.

Bars were used for determining heat distortion temperature (HDT) at 0.25 mm deflection in accordance with ASTM D 648-86. Either total deflection (TD) at 130° C. or alternately the temperature at which the bar was totally deflected (in the range of from 2.54 mm to 2.72 mm) was determined by continuing the test in accordance with ASTM D 648.86. Bars were also used for determination of refractive index and density. The results are shown in Table 6.

TABLE 6

Physical Properties of Polymerizates

| | Example | | | | | | | | |
|---|---|---|---|---|---|---|---|---|---|
| | 1 | 2 | 3 | 4 | 5 | 6 | 7 | 8 | 9 |
| Refractive Index, $n^{20}D$ | 1.555 | 1.557 | 1.578 | 1.561 | 1.547 | 1.546 | 1.560 | 1.552 | 1.556 |
| Density @ 21° C. g/mL | 1.201 | 1.194 | 1.191 | 1.254 | $ND^1$ | 1.226 | 1.199 | 1.199 | 1.202 |
| Barcol Hardness | | | | | | | | | |
| 0-second | 11 | 27 | 23 | 18 | ND | 15 | 0 | 11 | 10 |
| 15-second | 5 | 23 | 19 | 11 | 29 | 13 | 0 | 9 | 4 |
| HDT, °C. | 46 | 52 | 55 | 38.5 | 66 | >130 | 52 | 61 | 56 |
| TD, mm | 2.13 @130° C. | 1.57 @130° C. | 2.54 @96° C. | 2.67 @54° C. | 0.84 @130° C. | 0.13 @130° C. | 1.42 @130° C. | 2.44 @130° C. | 1.83 @130° C. |

$^1$ND = Not Determined

Photochromic resin solutions (PRS) were prepared by thoroughly admixing the various ingredients. The identities of the ingredients and their amounts were shown in Table 7.

TABLE 7

| PRS-1 | |
|---|---|
| Toluene | 85.5 parts |
| Ethyl Cellulose | 9.5 |
| PC-1 | 5 |
| PRS-2 | |
| Toluene | 85.5 parts |
| Ethyl Cellulose | 9.5 |
| PC-2 | 5 |
| PRS-3 | |
| Toluene | 85.5 parts |
| Ethyl Cellulose | 9.5 |
| PC-3 | 5 |
| PRS-4 | |
| Toluene | 86.6 parts |
| Ethyl Cellulose | 9.6 |
| PC-4 | 3.8 |
| PRS-5 | |
| 2,4-Pentanedione | 35.19 parts |
| n-Butanol | 17.59 |
| Cyclohexanone | 21.99 |

TABLE 7-continued

| | | |
|---|---|---|
| N-Methylpyrrolidinone | 2.64 | |
| Ethyl cellulose | 1.76 | |
| Poly(vinylpyrrolidone) K-90 | 8.80 | |
| PC-1 | 2.40 | |
| PC-4 | 2.32 | |
| PC-5 | 2.00 | |
| PC-6 | 1.28 | |
| ED | 2.66 | |
| PD | 1.34 | |
| FRD | 0.016 | |
| PRS-6 | | |
| PRS-5 | | 99.986 parts |
| FAC | | 0.020 |
| PRS-7 | | |
| Toluene | | 88.2 parts |
| Ethyl cellulose | | 9.8 |
| PC-4 | | 2.0 |
| PRS-8 | | |
| Toluene | | 87.4 parts |
| Ethyl cellulose | | 9.7 |
| PC-4 | | 1.94 |
| ED | | 0.64 |
| PD | | 0.32 |
| PRS-9 | | |
| Toluene | | 87.8 parts |
| Ethyl cellulose | | 9.76 |
| PC-4 | | 2.44 |

In Examples 1–4 and 6–9 photochromic resin solutions were spin coated onto polymerizate squares. In Example 5 photochromic resin solution was spin-coated onto the lens. The coated polymerizates were allowed to dry in air and then heated in a forced air oven at 135° C. to imbibe photochromic compound(s) into the polymerizates. In Examples 1–4 and 6–9 an uncoated square was heated with the coated squares. The heating periods are shown in Table 8.

TABLE 8

Heating Periods at 135° C.

| Example | Photochromic Resin Solution | Heating Period, Min, approximate |
|---|---|---|
| 1 | PRS-1 | 45–50 |
| 1 | PRS-2 | 75 |
| 1 | PRS-3 | 90 |
| 2 | PRS-2 | 75 |
| 2 | PRS-3 | 90 |
| 3 | PRS-4 | 60 |
| 4 | PRS-6 | 90 |
| 5 | PRS-5 | 140 |
| 6 | PRS-7 | 105–210 |
| 7 | PRS-8 | 45–60 |
| 8 | PRS-9 | 80–85 |
| 9 | PRS-2 | 75 |
| 9 | PRS-3 | 90 |

At the conclusion of the heating period, the polymerizates were removed from the oven and allowed to cool to room temperature. In Examples 1–3 and 6–9 used photochromic resin coating was removed from the coated polymerizates with acetone. In Examples 4 and 5 used photochromic resin coating was removed from the coated polymerizates with water. In all Examples the squares were thoroughly washed with acetone to ensure that no excess photochromic compound was left on the surfaces of the imbibed squares.

In Examples 1–4 and 6–9 the net absorbance at either 346 nm or 370 nm of most of the imbibed squares (viz., absorbance of the imbibed square in the bleached state minus the absorbance of the uncoated square) was determined at room temperature using a Varian Model Cary 3 spectrophotometer. The results are shown in Table 9.

TABLE 9

Net Absorbances

| | Photochromic | Net Absorbance | |
|---|---|---|---|
| Example | Resin Solution | at 346 nm | at 370 nm |
| 1 | PRS-1 | ND[1] | 1.04 |
| 1 | PRS-2 | ND | 1.38, 1.27 |
| 1 | PRS-3 | ND | 2.19, 2.09 |
| 2 | PRS-2 | ND | 1.22 |
| 2 | PRS-3 | ND | 2.10 |
| 3 | PRS-4 | 2.46 | ND |
| 4 | PRS-6 | 4.82 | ND |
| 5 | PRS-5 | ND | ND |
| 6 | PRS-7 | 1.77 | ND |
| 7 | PRS-8 | 2.70 | ND |
| 8 | PRS-9 | 2.67 | ND |
| 9 | PRS-2 | ND | 1.42 |
| 9 | PRS-3 | ND | 2.21 |

[1]ND = Not Determined

Photochromic performances for imbibed squares of Examples 1–4 and 6–9 were determined on an optical bench. The bench was mounted with a 300 watt Xenon arc lamp operated at about 200 watts, a remote controlled shutter, a Schott WG-320 nm cut off filter which removes short wavelength radiation; neutral density filter(s) and a constant temperature water bath in which the square to be tested was immersed. A collimated beam of light from a tungsten lamp was passed through the square at a small angle to the normal to the the square. After passing through the square, the light from the tungsten lamp impinged a beam splitter which split the beam into two secondary beams of equal intensity. The unreflected secondary beam was directed through a 620 nm band pass filter to a detector. The reflected secondary beam was directed through a 480 nm band pass filter to a detector. Alternatively, the unreflected secondary beam was directed through a photopic filter to a detector. The photopic filter passes wavelengths such that the detector mimics the response of the human eye. The output signals from the detector(s) were processed by a radiometer which delivered data to a computer.

Change in optical density ($\Delta OD$) was determined by closing the shutter from the Xenon lamp, inserting an imbibed square in the bleached state into the water bath which had a predetermined temperature, adjusting the transmittance scale to 100%, opening the shutter from the Xenon lamp to provide ultraviolet radiation to change the imbibed square from the bleached state to an activated (i.e., darkened) state, measuring the transmittance in the activated state, and calculating the change in optical density according to the formula $\Delta OD = \log(100/\% \, Ta)$ where % Ta is the percent transmittance in the activated state and the logarithm is to the base 10. The period of exposure to the ultraviolet light from the Xenon lamp at the time the percent transmittance is determined is noted, except in some instances when the exposure period is long enough to ensure that a substantially saturated state (i.e., a state of substantially maximum darkness) has been obtained. The temperature of the water bath is also noted.

In those instances when the bleach half life, $T_{1/2}$, is to be found, the exposure period is continued long enough to ensure attainment of a substantially unsaturated state and the $\Delta OD$ is then determined. The shutter from the Xenon lamp is closed and the time required for the $\Delta OD$ to decrease to one-half of the ΔOD at substantial saturation is determined. This time interval is taken as the bleach half life.

When fatigue is to be found, the ΔOD of the substantially saturated state is first determined. The imbibed square is then exposed at 52° C. to 351 nm ultraviolet light in a Q—U—V Accelerated Weathering Tester for an exposure period which is noted and which is taken as the fatigue time. At the end of the exposure period the imbibed square is allowed to return to the bleached state and then the ΔOD of the substantially saturated state is determined on the optical bench using the same procedure and water bath temperature as before. Fatigue is taken as the percent decrease in ΔOD of the substantially saturated state as compared with the ΔOD prior to exposure in the Q—U—V Accelerated Weathering Tester.

In Example 5 the percent transmittance of the imbibed lens in the bleached state was determined using a Spectro Gard II Spectrophotometer. The lens was then exposed for 10 minutes to the Sylvania GTE Blacklight Blue F40/BLB 40 watt light bulbs positioned about 30.5 mm above the lens. The percent transmittance was then quickly measured. The change in optical density was then calculated from the formula ΔOD=log(100/% Ta)-log(100/% Tb) where % TA is the percent transmittance of the activated state, % Tb is the percent transmittance of the bleached state, and the logarithms are to the base 10.

The results of photochromic performance testing are shown in Table 10–18 where the temperature, abbreviated temp., is that of the water bath the the wavelength is abbreviated λ.

TABLE 10

Example 1

| Photochromic Resin Solution | Temp., °C. | λ, nm | ΔOD 30 sec | ΔOD 15 min | Bleach T½ sec | Fatigue Time, hr | Fatigue % |
|---|---|---|---|---|---|---|---|
| PRS-1 | 22.2 | 480 | 0.068 | 0.430 | 228 | ND[1] | ND |
| PRS-2 | 22.2 | 480 | 0.079 | 0.298 | 178 | ND | ND |

TABLE 10-continued

Example 1

| Photochromic Resin Solution | Temp., °C. | λ, nm | ΔOD 30 sec | ΔOD 15 min | Bleach T½ sec | Fatigue Time, hr | Fatigue % |
|---|---|---|---|---|---|---|---|
| PRS-3 | 22.2 | 620 | 0.094 | 0.428 | 124 | ND | ND |
| PRS-1 | 35 | 480 | 0.061 | 0.179 | 69 | 25 | 37 |
| PRS-2 | 35 | 480 | 0.066 | 0.123 | 35 | 25 | 26 |
| PRS-3 | 35 | 620 | 0.072 | 0.122 | 24 | 50 | 39 |
| PRS-2 | 22.2 | PHOTOPIC | 0.078 | 0.186 | 192 | 25 | 36 |
|  |  |  |  |  |  | 50 | 56 |
| PRS-3 | 22.2 | PHOTOPIC | 0.161 | 0.435 | 136 | 25 | 25 |
|  |  |  |  |  |  | 50 | 39 |

TABLE 11

Example 2

| Photochromic Resin Solution | Temp., °C. | λ, nm | ΔOD 30 sec | ΔOD 15 min | Bleach T½ sec | Fatigue Time, hr | Fatigue % |
|---|---|---|---|---|---|---|---|
| PRS-2 | 22.2 | PHOTOPIC | 0.078 | 0.187 | 194 | 25 | 33 |
|  |  |  |  |  |  | 50 | 55 |
| PRS-3 | 22.2 | PHOTOPIC | 0.137 | 0.405 | 154 | 25 | 55 |
|  |  |  |  |  |  | 50 | 37 |

TABLE 12

Example 3

| Photochromic Resin Solution | Temp., °C. | λ, nm | ΔOD 30 sec | ΔOD 15 min | Bleach T½ sec | Fatigue Time, hr | Fatigue % |
|---|---|---|---|---|---|---|---|
| PRS-4 | 29.4 | 620 | 0.158 | 0.376 | 60 | 75 | 42 |

TABLE 13

Example 4

| Photochromic Resin Solution | Temp., °C. | λ, nm | ΔOD 30 sec | ΔOD 2 min | ΔOD 10 min | Bleach T½ sec | Fatigue Time, hr | Fatigue % |
|---|---|---|---|---|---|---|---|---|
| PRS-6 | 22.2 | PHOTOPIC | 0.136 | 0.320 | 0.520 | 185 | 25 | 5 |
|  |  |  |  |  |  |  | 75 | 10 |

TABLE 14

Example 5

| Photochromic Resin Solution | Temp., °C. | λ, nm | ΔOD 10 sec |
|---|---|---|---|
| PRS-5 | Ambient | Visible Spectrum | 0.379 |

TABLE 15

Example 6

| Photochromic Resin Solution | Temp., °C. | λ, nm | ΔOD 30 sec | ΔOD 2 min | ΔOD 10 min | Bleach T½ sec | Fatigue Time, hr | Fatigue % |
|---|---|---|---|---|---|---|---|---|
| PRS-7 | 29.4 | 620 | 0.225 | 0.374 | 0.455 | 43 | 75 | 81 |

TABLE 16

Example 7

| Photochromic Resin Solution | Temp., °C. | λ, nm | ΔOD 30 sec | ΔOD 2 min | ΔOD 10 min | Bleach T½ sec | Fatigue Time, hr | Fatigue % |
|---|---|---|---|---|---|---|---|---|
| PRS-8 | 29.4 | 620 | 0.218 | 0.310 | 0.336 | 24 | 75 | 70 |

TABLE 17

Example 8

| Photochromic Resin Solution | Temp., °C. | λ, nm | ΔOD 30 sec | ΔOD 2 min | ΔOD 10 min | Bleach T½ sec | Fatigue Time, hr | Fatigue % |
|---|---|---|---|---|---|---|---|---|
| PRS-9 | 29.4 | 620 | 0.255 | 0.394 | 0.457 | 33 | 75 | 40 |

TABLE 18

Example 9

| Photochromic Resin Solution | Temp., °C. | λ, nm | ΔOD 30 sec | ΔOD 15 min | Bleach T½ sec | Fatigue Time, hr | Fatigue % |
|---|---|---|---|---|---|---|---|
| PRS-2 | 22.2 | PHOTO-PIC | 0.089 | 0.195 | 166 | 25 | 37 |
|  |  |  |  |  |  | 50 | 56 |
| PRS-3 | 22.2 | PHOTO-PIC | 0.179 | 0.455 | 124 | 25 | 24 |
|  |  |  |  |  |  | 50 | 38 |

Although the present invention has been described with reference to specific details of certain embodiments thereof, it is not intended that such details should be retarded as limitations upon the scope of the invention except insofar as they are included in the accompanying claims.

We claim:

1. In a photochromic organic ophthalmic article comprising in combination:

(a) a thermoset organic polymeric matrix having a front surface and a rear surface; and (b) photochromic compound;

the improvement wherein:

(c) said matrix comprises polymer formed by polymerizing polymerizable composition comprising:

(1) high refractive index imparting monomer selected from the group consisting of bisphenol A bis((meth)acrylate), ethoxylated bisphenol A bis((meth)acrylate) containing from greater than 0 to 10 ethyleneoxy groups, phenoxyethyl (meth)acrylate, thiodiphenol bis((meth)acrylate), styrene, α-methylstyrene, divinylbenzene, diisopropenylbenzene, diallyl phthalate which constitutes from 0 to 40 percent by weight of the total monomer of said composition, bisphenol A bis(allyl carbonate), and a mixture of at least two or more thereof, wherein said diallyl phthalate is diallyl o-phthalate, diallyl m-phthalate, diallyl p-phthalate, or a mixture of two or more thereof, and (2) aromatic ring-containing inert plasticizer selected from the group consisting of poly(ethylene glycol) dibenzoate, poly(propylene glycol) dibenzoate, 1,3-bis(phenylthio)propane, and a mixture of at least two thereof; and (d) said article has a refractive index at 20° C. and a wavelength of 589.3 nanometers of at least 1.53.

2. In a photochromic organic ophthalmic article comprising in combination:

(a) a thermoset organic polymeric matrix having a front surface and a rear surface; and (b) photochromic compound;

the improvement wherein:

(c) said matrix comprises polymer formed by polymerizing polymerizable composition comprising:

(1) high refractive index imparting monomer selected from the group consisting of bisphenol A bis((meth)acrylate), ethoxylated bisphenol A bis((meth)acrylate) containing from greater than 0 to 10 ethyleneoxy groups, phenoxyethyl (meth)acrylate, thiodiphenol bis((meth)acrylate), styrene, α-methylstyrene, divinylbenzene, diisopropenylbenzene, diallyl phthalate which constitutes from 0 to 40 percent by weight of the total monomer of said composition, bisphenol A bis(allyl carbonate), and a mixture of at least two or more thereof, wherein said diallyl phthalate is diallyl o-phthalate, diallyl m-phthalate, diallyl p-phthalate, or a mixture of two or more thereof, (2) aromatic ring-containing inert plasticizer, and (3) flexible monomer selected from the group consisting of (meth)acrylate of monoalkyl ether of poly (alkylene glycol), monoaryl ether of poly(alkylene glycol) mono((meth)acrylate), and a mixture thereof; and (d) said article has a refractive index at 20° C. and a wavelength of 589.3 nanometers of at least 1.53.

3. In a photochromic organic ophthalmic article comprising in combination:

(a) a thermoset organic polymeric matrix having a front surface and a rear surface; and (b) photochromic compound;

the improvement wherein:

(c) said matrix comprises polymer formed by polymerizing polymerizable composition comprising:

(1) high refractive index imparting monomer selected from the group consisting of bisphenol A bis((meth) acrylate), ethoxylated bisphenol A bis((meth) acrylate) containing from greater than 0 to 10 ethyleneoxy groups, phenoxyethyl (meth)acrylate, thiodiphenol bis((meth)acrylate), styrene, α-methylstyrene, divinylbenzene, diisopropenylbenzene, diallyl phthalate which constitutes from 0 to 40 percent by weight of the total monomer of said composition, bisphenol A bis(allyl carbonate), and a mixture of at least two or more thereof, wherein said diallyl phthalate is diallyl o-phthalate, diallyl m-phthalate, diallyl p-phthalate, or a mixture of two or more thereof, (2) aromatic ring-containing inert plasticizer, and (3) flexible monomer which comprises poly((meth) acrylate) of alkoxylated polyol containing at least 9 alkoxy groups; and (d) said article has a refractive index at 20° C. and a wavelength of 589.3 nanometers of at least 1.53.

4. In a photochromic organic ophthalmic article comprising in combination:

(a) a thermoset organic polymeric matrix having a front surface and a rear surface; and (b) photochromic compound imbibed into at least one of said surfaces;

the improvement wherein:

(c) said matrix comprises polymer formed by polymerizing polymerizable composition comprising aromatic ring-containing inert plasticizer;

(d) said aromatic ring-containing inert plasticizer has a refractive index at 20° C. and a wavelength of 589.3 nm of at least 1.48 and is selected from the group consisting of poly(ethylene glycol)dibenzoate, poly(propylene glycol) dibenzoate, 1,3-bis(phenylthio)propane, and a mixture of at least two thereof; and (e) said article has a refractive index at 20° C. and a wavelength of 589.3 nanometers of at least 1.53.

5. In a photochromic organic ophthalmic article comprising in combination:

(a) a thermoset organic polymeric matrix having a front surface and a rear surface; and (b) photochromic compound imbibed into at least one of said surfaces;

the improvement wherein:

(c) said matrix comprises polymer formed by polymerizing polymerizable composition comprising:

(1) aromatic ring-containing inert plasticizer, and (2) flexible monomer selected from the group consisting of (meth)acrylate of monoalkyl ether of poly (alkylene glycol), monoaryl ether of poly(alkylene glycol) mono(meth)acrylate), and a mixture thereof; and (d) said article has a refractive index at 20° C. and a wavelength of 589.3 nanometers of at least 1.53.

6. In a photochromic organic ophthalmic article comprising in combination:

(a) a thermoset organic polymeric matrix having a front surface and a rear surface; and (b) photochromic compound imbibed into at least one of said surfaces;

the improvement wherein:

(c) said matrix comprises polymer formed by polymerizing polymerizable composition comprising:

(1) aromatic ring-containing inert plasticizer, and (2) flexible monomer which comprises poly((meth) acrylate) of alkoxylated polyol containing at least 9 alkoxy groups; and (d) said article has a refractive index at 20° C. and a wavelength of 589.3 nanometers of at least 1.53.

7. In a photochromic organic ophthalmic article comprising in combination:

(a) a thermoset organic polymeric matrix having a front surface and a rear surface; and (b) photochromic compound the improvement wherein:

(c) said matrix comprises polymer formed by polymerizing polymerizable composition comprising:

(1) high refractive index imparting monomer selected from the group consisting of bisphenol A bis((meth) acrylate), ethoxylated bisphenol A bis((meth) acrylate) containing from greater than 0 to 10 ethyleneoxy groups, phenoxyethyl (meth)acrylate, thiodiphenol bis((meth)acrylate), styrene, α-methylstyrene, divinylbenzene, diisopropenylbenzene, diallyl phthalate which constitutes from 0 to 40 percent by weight of the total monomer of said composition, bisphenol A bis(allyl carbonate), and a mixture of at least two or more thereof, wherein said diallyl phthalate is diallyl o-phthalate, diallyl m-phthalate, diallyl p-phthalate, or a mixture of two or more thereof, and (2) flexible monomer selected from the group consisting of (meth)acrylate of monoalkyl ether of poly (alkylene glycol), monoaryl ether of poly(alkylene glycol) mono((meth)acrylate), and a mixture thereof; and (d) said article has a refractive index at 20° C. and a wavelength of 589.3 nanometers of at least 1.53.

8. In a photochromic organic ophthalmic article comprising in combination:

(a) a thermoset organic polymeric matrix having a front surface and a rear surface; and (b) photochromic compound the improvement wherein:

(c) said matrix comprises polymer formed by polymerizing polymerizable composition comprising:

(1) high refractive index imparting monomer selected from the group consisting of bisphenol A bis((meth) acrylate), ethoxylated bisphenol A bis((meth) acrylate) containing from greater than 0 to 10 ethyleneoxy groups, phenoxyethyl (meth)acrylate,

23 thiodiphenol bis((meth)acrylate), styrene, α-methylstyrene, divinylbenzene, diisopropenylbenzene, diallyl phthalate which constitutes from 0 to 40 percent by weight of the total monomer of said composition, bisphenol A bis(allyl carbonate), and a mixture of at least two or more thereof, wherein said diallyl phthalate is diallyl o-phthalate, diallyl m-phthalate, diallyl p-phthalate, or a mixture of two or more thereof, and (2) flexible monomer comprising poly((meth)acrylate) of alkoxylated polyol containing at least 9 alkoxy groups; and (d) said article has a refractive index at 20° C. and a wavelength of 589.3 nanometers of at least 1.53.

9. In a photochromic organic ophthalmic lens or lens blank comprising in combination:

(a) a thermoset organic polymeric matrix having a front surface and a rear surface; and (b) photochromic compound the improvement wherein:

(c) said matrix comprises polymer formed by polymerizing polymerizable composition comprising:

(1) high refractive index imparting monomer selected from the group consisting of bisphenol A bis (methacrylate), ethoxylated bisphenol A bis (methacrylate) containing from greater than 0 to 10 ethyleneoxy groups, phenoxyethyl methacrylate, thiodiphenol bis(methacrylate), α-methylstyrene, diisopropenylbenzene, diallyl phthalate which constitutes from 0 to 40 percent by weight of the total monomer of said composition, bisphenol A bis(allyl carbonate), and a mixture of at least two thereof, wherein said diallyl phthalate is diallyl o-phthalate, diallyl m-phthalate, diallyl p-phthalate, or a mixture of two or more thereof, and (2) flexible monomer selected from the group consisting of (meth)acrylate of monoalkyl ether of poly(alkylene glycol), monoaryl ether of poly(alkylene glycol) mono((meth)acrylate), poly((meth)acrylate) of alkoxylated polyol containing at least 9 alkoxy groups, and a mixture of at least two thereof;

(d) said photochromic compound is selected from the group consisting of 1,3-dihydro-3,3-dimethyl-5-methoxy-1-propyl-spiro[2H-indol-2,3'-[3H]pyrido{3,2-f}(1,4)benzoxazine];

1,3-dihydro-3,3,4,5-tetramethyl-1-propyl-spiro[2H-indole-2,3'-[3H]pyrido{3,2-f}(1,4)benzoxazine];

1,3-dihydro-3,3,5,6-tetramethyl-1-propyl-spiro[2H-indole-2,3'-[3H]pyrido{3,2-f}(1,4)benzoxazine];

3-(2,4-dimethoxy)phenyl-3-(4-methoxy)phenyl-3H-naphtho[2,1-b]pyran;

1,3,3,4,5-pentamethyl-9'-methoxycarbonyl-8'-acetoxy-spiro[indoline-2-3'-[3H]naphth[2,1,b][1,4]oxazine];

1,3,3,5,6-pentamethyl-9'-methoxycarbonyl-8'-acetoxy-spiro[indoline-2,3'-[3H]naphth[2,1,b][1,4]oxazine];

3(2-fluorophenyl)-3(4-methoxyphenyl)-8-methoxy-3H-naphtho[2,1-b]pyran;

3(2-fluorophenyl)-3(4-methoxyphenyl)-8-methoxy-9-carbomethoxy-3H-naphtho[2,1-b]pyran; and a mixture of at least two thereof;

(e) said lens or lens blank is characterized by an absolute value of optical correction of at least 2 diopters;

(f) said lens or lens blank has a refractive index at 20° C. and a wavelength of 589.3 nanometers of at least 1.53;

(g) said lens or lens blank has a heat distortion temperature of at least 35° C.; and

24

(h) said lens or lens blank has a bleach transmission of at least 40 percent.

10. In a photochromic organic ophthalmic article comprising in combination:

(a) a thermoset organic polymeric matrix having a front surface and a rear surface; and (b) photochromic compound the improvement wherein:

(c) said matrix comprises polymer formed by polymerizing polymerizable composition comprising:

(1) high refractive index imparting monomer selected from the group consisting of bisphenol A bis((meth) acrylate), ethoxylated bisphenol A bis((meth) acrylate) containing from greater than 0 to 10 ethyleneoxy groups, phenoxyethyl (meth)acrylate, thiodiphenol bis((meth)acrylate), styrene, α-methylstyrene, divinylbenzene, diisopropenylbenzene, diallyl phthalate which constitutes from 0 to 40 percent by weight of the total monomer of said composition, bisphenol A bis(allyl carbonate), and a mixture of at least two or more thereof, wherein said diallyl phthalate is diallyl o-phthalate, diallyl m-phthalate, diallyl p-phthalate, or a mixture of two or more thereof, (2) flexible monomer, and (3) aromatic-ring containing inert plasticizer which has a refractive index at 20° C. and a wavelength of 589.3 nm of at least 1.48 and which is selected from the group consisting of poly(ethylene glycol) dibenzoate, poly(propylene glycol) dibenzoate, 1,3-bis(phenylthio)propane, and a mixture of at least two thereof; and (d) said article has a refractive index at 20° C. and a wavelength of 589.3 nanometers of at least 1.53.

11. In a photochromic organic ophthalmic article comprising in combination:

(a) a thermoset organic polymeric matrix having a front surface and a rear surface; and (b) photochromic compound imbibed into at least one of said surfaces;

the improvement wherein:

(c) said matrix comprises polymer formed by polymerizing polymerizable composition comprising flexible monomer selected from the group consisting of (meth)acrylate of monoalkyl ether of poly(alkylene glycol), monoaryl ether of poly(alkylene glycol) mono((meth)acrylate), and a mixture thereof; and (d) said article has a refractive index at 20° C. and a wavelength of 589.3 nanometers of at least 1.53.

12. In a photochromic organic ophthalmic article comprising in combination:

(a) a thermoset organic polymeric matrix having a front surface and a rear surface; and (b) photochromic compound imbibed into at least one of said surfaces;

the improvement wherein (c) said matrix comprises polymer formed by polymerizing polymerizable composition comprising flexible monomer which comprises poly((meth)acrylate) of alkoxylated polyol containing at least 9 alkoxy groups; and (d) said article has a refractive index at 20° C. and a wavelength of 589.3 nanometers of at least 1.53.

13. In a photochromic organic ophthalmic lens or lens blank comprising in combination:

(a) a thermoset organic polymeric matrix having a front surface and a rear surface; and (b) photochromic compound imbibed into at least one of said surfaces;

the improvement wherein:

(c) said matrix comprises polymer formed by polymerizing polymerizable composition comprising:

(1) high refractive index imparting monomer selected from the group consisting of bisphenol A bis (methacrylate), ethoxylated bisphenol A bis (methacrylate) containing from greater than 0 to 10 ethyleneoxy groups, phenoxyethyl methacrylate, thiodiphenol bis(methacrylate), α-methylstyrene, diisopropenylbenzene, diallyl phthalate, bisphenol A bis(allyl carbonate), and a mixture of at least two thereof, and (2) flexible monomer selected from the group consisting of (meth)acrylate of monoalkyl ether of poly (alkylene glycol), monoaryl ether of poly(alkylene glycol) mono((meth)acrylate), poly((meth)acrylate) of alkoxylated polyol containing at least 9 alkoxy groups, and a mixture thereof;

(d) said photochromic compound is selected from the group consisting of 1,3-dihydro-3,3-dimethyl-5-methoxy-1-propyl-spiro[2H-indol-2,3'-[3H]pyrido{3,2-f}(1,4)benzoxazine];

1,3-dihydro-3,3,4,5-tetramethyl-1-propyl-spiro[2H-indole-2,3'-[3H]pyrido{3,2-f}(1,4)benzoxazine];

1,3-dihydro-3,3,5,6-tetramethyl-1-propyl-spiro[2H-indole-2,3'-[3H]pyrido{3,2-f}(1,4)benzoxazine];

3-(2,4-dimethoxy)phenyl-3-(4-methoxy)phenyl-3H-naphtho[2,1-b]pyran;

1,3,3,4,5-pentamethyl-9'-methoxycarbonyl-8'-acetoxy-spiro [indoline-2-3'-[3H]naphth[2,1,b][1,4]oxazine];

1,3,3,5,6-pentamethyl-9'-methoxycarbonyl-8'-acetoxy-spiro [indoline-2,3'-[3H]naphth[2,1,b][1,4]oxazine];

3(2-fluorophenyl)-3(4-methoxyphenyl)-8-methoxy-3H-naphtho[2,1-b]pyran;

3(2-fluorophenyl)-3(4-methoxyphenyl)-8-methoxy-9-carbomethoxy-3H-naphtho[2,1-b]pyran; and a mixture of at least two thereof;

(e) said lens or lens blank has a heat distortion temperature of at least 35° C.;

(f) said lens or lens blank has a bleach transmission of at least 40 percent;

(g) said lens or lens blank has a refractive index at 20° C. and a wavelength of 589.3 nanometers of at least 1.53; and (h) said lens or lens blank is characterized by an absolute value of optical correction of at least 2 diopters.

14. In a photochromic organic ophthalmic lens or lens blank comprising in combination:

(a) a thermoset organic polymeric matrix having a front surface and a rear surface; and (b) photochromic compound;

the improvement wherein:

(c) said matrix comprises polymer formed by polymerizing polymerizable composition comprising:

(1) high refractive index imparting monomer selected from the group consisting of bisphenol A bis (methacrylate), ethoxylated bisphenol A bis (methacrylate) containing from greater than 0 to 10 ethyleneoxy groups, phenoxyethyl methacrylate, thiodiphenol bis(methacrylate), α-methylstyrene, diisopropenylbenzene, diallyl phthalate which constitutes from 0 to 40 percent by weight of the total monomer of said composition, bisphenol A bis(allyl carbonate), and a mixture of at least two thereof, wherein said diallyl phthalate is diallyl o-phthalate, diallyl m-phthalate, diallyl p-phthalate, or a mixture of two or more thereof, and (2) aromatic ring-containing inert plasticizer selected from the group consisting of poly (ethylene glycol) dibenzoate, poly (propylene glycol) dibenzoate, 1,3-bis(phenylthio) propane, and a mixture of at least two thereof;

(d) said photochromic compound is selected from the group consisting of 1,3-dihydro-3,3-dimethyl-5-methoxy-1-propyl-spiro[2H-indol-2,3'-[3H]pyrido{3,2-f}(1,4) benzoxazine];

1,3-dihydro-3,3,4,5-tetramethyl-1-propyl-spiro[2H-indole-2,3'-[3H]pyrido{3,2-f}(1,4)benzoxazine];

1,3-dihydro-3,3,5,6-tetramethyl-1-propyl-spiro[2H-indole-2,3'-[3H]pyrido{3,2-f}(1,4)benzoxazine];

3-(2,4-dimethoxy)phenyl-3-(4-methoxy)phenyl-3H-naphtho[2,1-b]pyran;

1,3,3,4,5-pentamethyl-9'-methoxycarbonyl-8'-acetoxy-spiro [indoline-2-3'-[3H]naphth[2,1,b][1,4]oxazine];

1,3,3,5,6-pentamethyl-9'-methoxycarbonyl-8'-acetoxy-spiro [indoline-2,3'-[3H]naphth[2,1,b][1,4]oxazine];

3(2-fluorophenyl)-3(4-methoxyphenyl)-8-methoxy-3H-naphtho[2,1-b]pyran;

3(2-fluorophenyl)-3(4-methoxyphenyl)-8-methoxy-9-carbomethoxy-3H-naphtho[2,1-b]pyran; and a mixture of at least two thereof;

(e) said lens or lens blank has a heat distortion temperature of at least 35° C.;

(f) said lens or lens blank has a bleach transmission of at least 40 percent;

(g) said lens or lens blank has a refractive index at 20° C. and a wavelength of 589.3 nanometers of at least 1.53; and (h) said lens or lens blank is characterized by an absolute value of optical correction of at least 2 diopters.

15. In a photochromic organic ophthalmic lens or lens blank comprising in combination:

(a) a thermoset organic polymeric matrix having a front surface and a rear surface; and (b) photochromic compound imbibed into at least one of said surfaces;

the improvement wherein:

(c) said matrix comprises polymer formed by polymerizing polymerizable composition comprising:

(1) high refractive index imparting monomer selected from the group consisting of bisphenol A bis (methacrylate), ethoxylated bisphenol A bis (methacrylate) containing from greater than 0 to 10 ethyleneoxy groups, phenoxyethyl methacrylate, thiodiphenol bis(methacrylate), α-methylstyrene, diisopropenylbenzene, diallyl phthalate, bisphenol A bis(allyl carbonate), and a mixture of at least two thereof, and (2) aromatic ring-containing inert plasticizer selected from the group consisting of poly(ethylene glycol) dibenzoate, poly(propylene glycol) dibenzoate, 1,3-bis(phenylthio)propane, and a mixture of at least two thereof;

(d) said photochromic compound is selected from the group consisting of 1,3-dihydro-3,3-dimethyl-5-methoxy-1-propyl -spiro[2H-indol-2,3'-[3H]pyrido{3,2-f}benzoxazine];

1,3-dihydro-3,3,4,5-tetramethyl-1-propyl-spiro[2H-indole-2,3'-[3H]pyrido{3,2-f}(1,4)benzoxazine];

1,3-dihydro-3,3,5,6-tetramethyl-1-propyl-spiro[2H-indole-2,3'-[3H]pyrido{3,2-f}(1,4)benzoxazine];

3-(2,4-dimethoxy)phenyl-3-(4-methoxy)phenyl-3H-naphtho[2,1-b]pyran;

1,3,3,4,5-pentamethyl-9'-methoxycarbonyl-8'-acetoxy-spiro[indoline-2-3'-[3H]naphth[2,1,b][1,4]oxazine];

1,3,3,5,6-pentamethyl-9'-methoxycarbonyl-8'-acetoxy-spiro[indoline-2,3'-[3H]naphth[2,1,b][1,4]oxazine];

3(2-fluorophenyl)-3(4-methoxyphenyl)-8-methoxy-3H-naphtho[2,1-b]pyran;

3(2-fluorophenyl)-3(4-methoxyphenyl)-8-methoxy-9-carbomethoxy-3H-naphtho[2,1-b]pyran; and a mixture of at least two thereof;

(e) said lens or lens blank has a heat distortion temperature of at least 35° C.;

(f) said lens or lens blank has a bleach transmission of at least 40 percent;

(g) said lens or lens blank has a refractive index at 20° C. and a wavelength of 589.3 nanometers of at least 1.53; and (h) said lens or lens blank is characterized by an absolute value of optical correction of at least 2 diopters.

* * * * *